US009462498B2

(12) United States Patent
Lee et al.

(10) Patent No.: US 9,462,498 B2
(45) Date of Patent: Oct. 4, 2016

(54) METHOD FOR MEASURING TO ELIMINATE IDC INTERFERENCE IN WIRELESS COMMUNICATION SYSTEM AND DEVICE FOR SAME (75) Inventors: Jaewook Lee, Anyang-si (KR); Sungduck Chun, Anyang-si (KR); Seungjune Yi, Anyang-si (KR); Sunghoon Jung, Anyang-si (KR); Youngdae Lee, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 13/825,479

(22) PCT Filed: Oct. 5, 2011

(86) PCT No.: PCT/KR2011/007348
§ 371 (c)(1),
(2), (4) Date: Mar. 21, 2013

(87) PCT Pub. No.: WO2012/053755
PCT Pub. Date: Apr. 26, 2012

(65) Prior Publication Data
US 2013/0176891 A1 Jul. 11, 2013

Related U.S. Application Data (60) Provisional application No. 61/394,742, filed on Oct. 19, 2010.

(51) Int. Cl.
*H04W 24/10* (2009.01)
*H04W 28/04* (2009.01)
(Continued)

(52) U.S. Cl.
CPC .............. *H04W 24/10* (2013.01); *H04B 1/525* (2013.01); *H04W 28/048* (2013.01); *H04W 48/16* (2013.01); *H04W 88/06* (2013.01)

(58) Field of Classification Search
CPC . H04W 24/10; H04W 36/24; H04W 28/048; H04W 46/16; H04W 88/06; H04W 1/525
USPC .......... 370/252, 317, 322, 329; 455/434, 88, 455/63, 67
See application file for complete search history.

(56) References Cited

U.S. PATENT DOCUMENTS 8,072,896 B2 * 12/2011 Wilhelmsson ................ 370/252
2008/0176571 A1 7/2008 Choi
(Continued)

FOREIGN PATENT DOCUMENTS

EP 2 222 115 A1 8/2010
KR 10-2006-0038689 A 5/2006
(Continued)

OTHER PUBLICATIONS

LG Electronics Inc., "Possible Solutions for In-device Interference Avoidance", 3GPP TSG-RAN2 Meeting #71, Agenda Item: 7.6, Madrid, Spain, Aug. 23-27, 2010, pp. 1-2, R2-104880.

*Primary Examiner* — Jianye Wu
(74) *Attorney, Agent, or Firm* — Birch, Stewart, Kolasch & Birch, LLP (57) ABSTRACT

The present invention discloses a method for a first communication module of a user equipment measuring for eliminating in-device coexistence (IDC) interference in a wireless communication system. More particularly, the present invention comprises the following steps: receiving a message from one or more second communication modules which coexists in the terminal; performing inter-frequency measurement based on the setting information related to measuring when the message indicates the beginning of the operation of the second communication module; and reporting to the base station the result of the inter-frequency measurement.

9 Claims, 8 Drawing Sheets (51) Int. Cl.
  *H04W 48/16* (2009.01)
  *H04W 88/06* (2009.01)
  *H04B 1/525* (2015.01)

(56) References Cited

U.S. PATENT DOCUMENTS

2010/0048209 A1* 2/2010 Aoyama et al. ............ 455/435.2
2011/0045832 A1* 2/2011 Yang et al. .................. 455/436
2011/0243094 A1* 10/2011 Dayal et al. .................. 370/331
2013/0010619 A1* 1/2013 Fong et al. ................... 370/252
2013/0242919 A1* 9/2013 Koo et al. ..................... 370/329

FOREIGN PATENT DOCUMENTS

KR   10-2008-0068325 A    7/2008
WO   WO2012044329 A1 *   4/2012    ............... 370/252

* cited by examiner

(a) control-plane protocol stack (b) user-plane protocol stack

METHOD FOR MEASURING TO ELIMINATE IDC INTERFERENCE IN WIRELESS COMMUNICATION SYSTEM AND DEVICE FOR SAME

CROSS REFERENCE TO RELATED APPLICATIONS

This application is the National Phase of PCT/KR2011/007348 filed on Oct. 5, 2011, which claims priority under 35 U.S.C. §119(e) to U.S. Provisional Application No. 61/394,742 filed on Oct. 19, 2010, all of which are hereby expressly incorporated by reference into the present application.

TECHNICAL FIELD

The present invention relates to a wireless communication system, and more particularly, to a method for measurement to eliminate in-device coexistence (IDC) interference in a wireless communication system and a device for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

Figure 1:
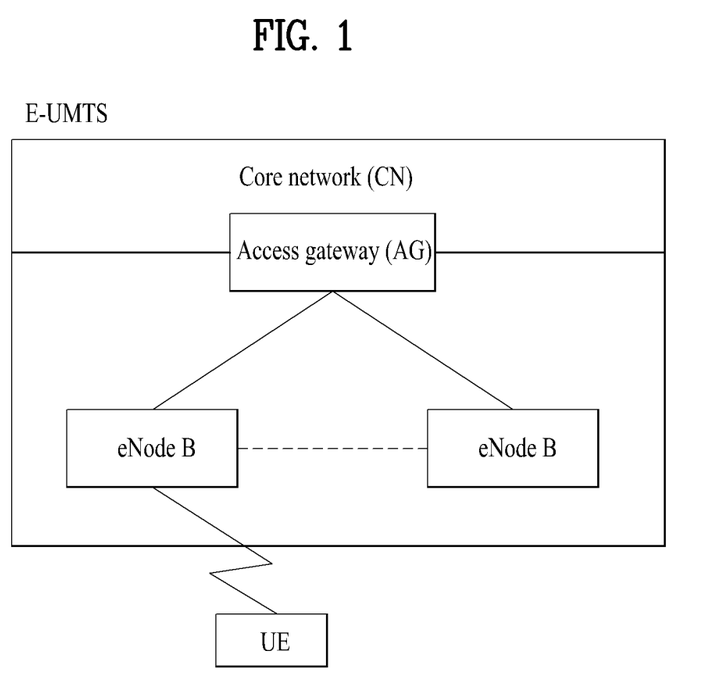
FIG. 1 is a diagram illustrating a network structure of an Evolved Universal Mobile Telecommunications System (E-UMTS), which is an example of a wireless communication system.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

An object of the present invention devised to solve the conventional problem is to provide a method for measurement to eliminate in-device coexistence (IDC) interference in a wireless communication system and a device for the same.

Technical Solution

In one aspect of the present invention, a method for allowing a first communication module of a user equipment to perform measurement to eliminate In-Device Coexistence (IDC) interference in a wireless communication system comprises the steps of: receiving measurement related setup information from a base station; receiving a message from one or more second communication modules which coexist in the user equipment; performing inter-frequency measurement on the basis of the measurement related setup information if the message indicates driving start of the second communication module; and reporting to the base station the result of the inter-frequency measurement.

In another aspect of the present invention, a user equipment in a wireless communication system comprises a first communication module for transmitting and receiving a signal to and from a first communication system; and one or more second communication modules for transmitting and receiving a signal to and from other communication system, wherein the first communication module receive measurement related setup information from a base station, receives a message from the one or more second communication modules which coexist in the user equipment, performs inter-frequency measurement on the basis of the measurement related setup information if the message indicates driving start of the second communication module, and reports to the base station the result of the inter-frequency measurement.

The measurement related setup information includes a threshold value (s-measure) related to a measured result of a serving cell. If the message indicates driving start of the second communication module, the threshold value (s-measure) included in the measurement related setup information is disregarded.

However, if the message indicates driving end of the second communication module, the first communication module compares a frequency measured value of a serving frequency of the first communication module with the threshold value, and performs inter-frequency measurement if the frequency measured value is less than the threshold value.

Preferably, driving start of the second communication module corresponds to a power-on operation of the second communication module or a traffic transmission and reception operation of the second communication module.

Also, the one or more second communication modules include at least one of a transmission and reception module for WiFi system, a Bluetooth transmission and reception module, and a global positioning system (GPS) reception module.

Advantageous Effects

According to the embodiments of the present invention, the user equipment may effectively eliminate IDC interference.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 2:
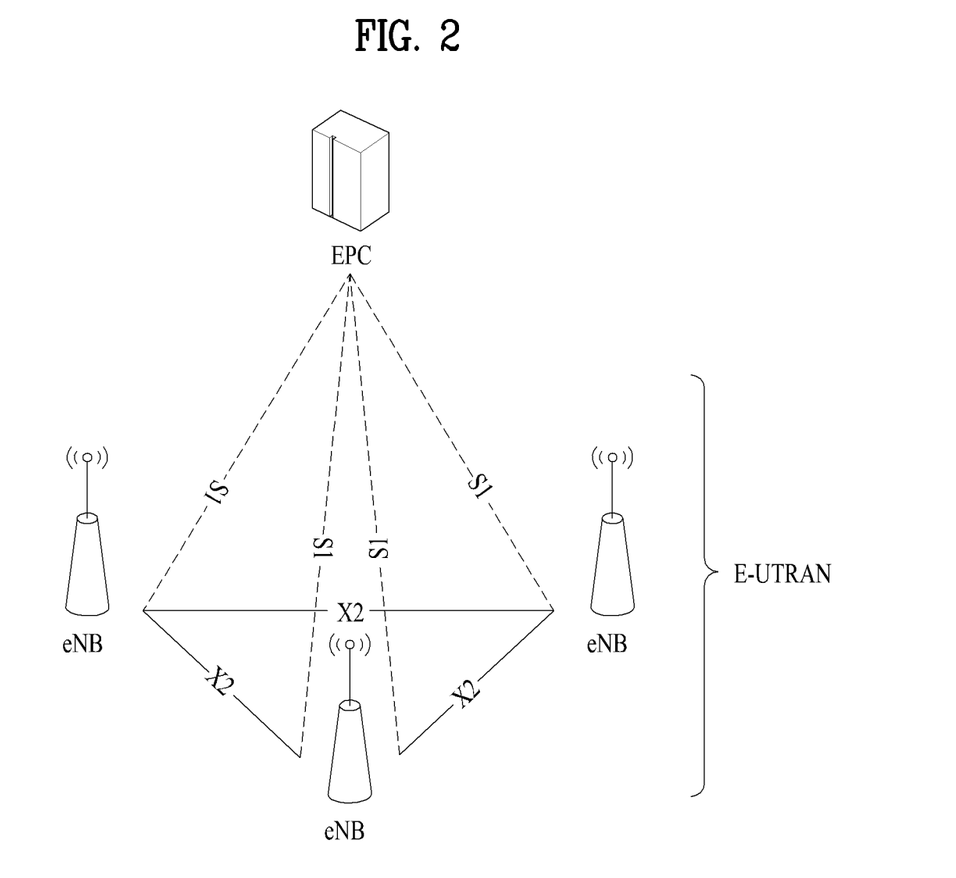
FIG. 2 is a diagram illustrating a network structure of an evolved universal terrestrial radio access network (E-UTRAN)

FIG. 2 is a diagram illustrating a network structure of an Evolved Universal Terrestrial Radio Access Network (E-UTRAN) which is an example of a mobile communication system. In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

Figure 3:
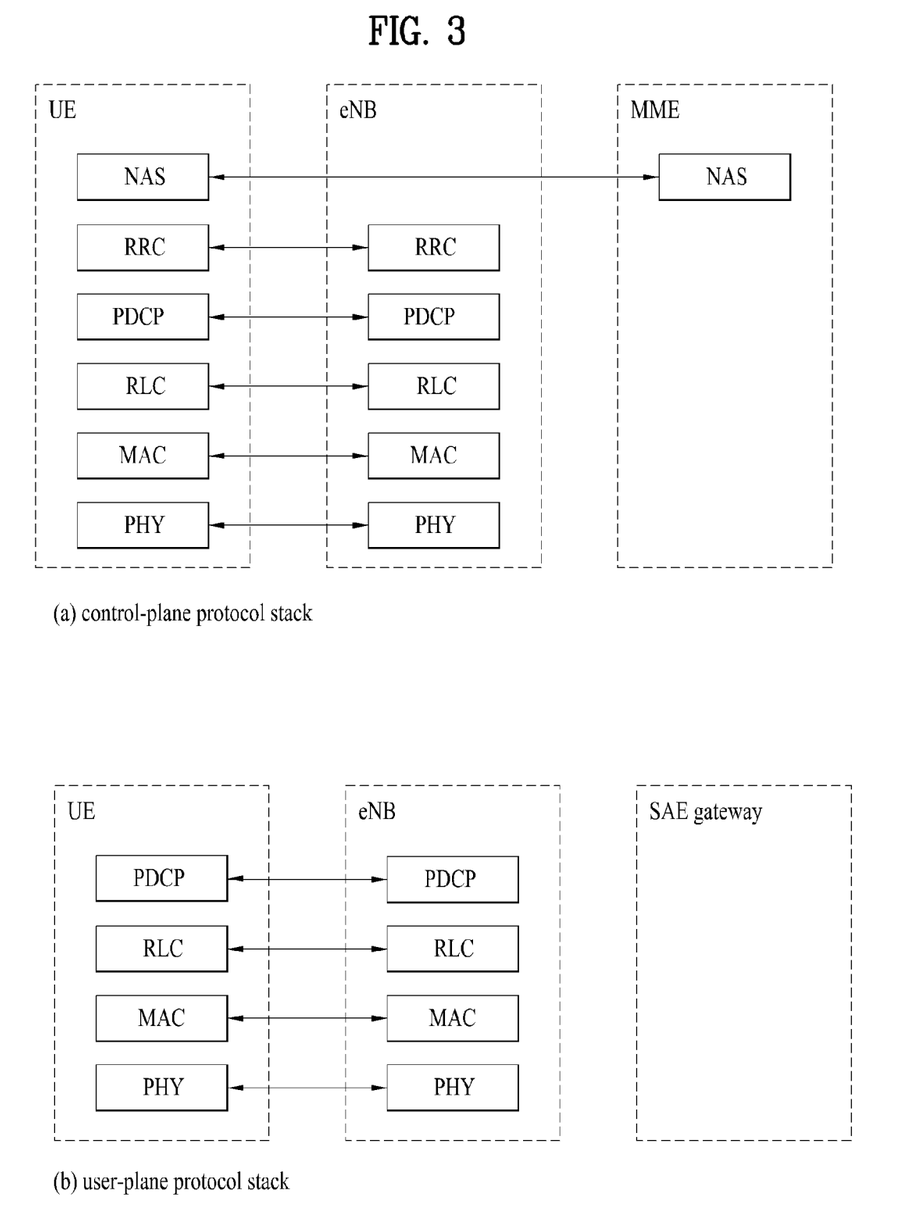
FIG. 3 is a diagram illustrating structures of a control plane and a user plane of a radio interface protocol between a user equipment and an E-UTRAN based on the 3GPP radio access network standard.

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC_CONNECTED state, on the basis of cell unit, it may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit. In other words, in order that the user equipment which is in the RRC_IDLE state receives a normal mobile communication service such as voice or data, the user equipment should be shifted to the RRC_CONNECTED state.

In particular, when the user initially turns on the power of the user equipment, the user equipment searches for a proper cell and then is maintained in the RRC_IDLE state in the corresponding cell. The user equipment maintained in the RRC idle state performs RRC connection with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message transmitted from the E-UTRAN should be transmitted.

Hereinafter, measurement and measurement report will be described.

In the following description, 'measurement' may be defined that the user equipment measures a quality value of a corresponding cell by receiving reference signals received from cells located in inter-frequency, intra-frequency and inter-RAT in accordance with measurement configuration received from the network. Also, 'quality' means signal quality or cell quality identified by the reference signal received from a target cell for measurement.

In respect of mobility support of the user equipment in the mobile communication system, the user equipment continues to measure quality of a serving cell that currently provides a service and quality of a neighboring cell per discontinuous reception (DRX) period. The user equipment reports the measured result of cell quality to the network at a proper time, and the network provides optimized mobile to the user equipment through handover, etc.

The user equipment may perform measurement of a specific purpose set by the network to provide information, which may assist a network provider to manage the network, in addition to the purpose of mobility support, and may report the measured result of cell quality to the network. For example, the user equipment receives broadcast information of a specific cell determined by the network. The user equipment may report cell identify (referred to as global cell identity) of the specific cell, location identification information (for example, tracking area code) to which the specific cell belongs, and/or other cell information (for example, whether the cell is a closed subscriber group (CSG) cell member or not) to the serving cell.

If the user equipment which is moving identifies that quality of a specific zone is very bad, through measurement, it may report location information of the cells of which quality is bad and the measured result of cell quality to the network. The network may optimize the network on the basis of the report of the measured result of cell quality of the user equipments that assist management of the network.

In a mobile communication system of which frequency reuse factor is 1, mobility is performed between different cells of the same frequency band. Accordingly, in order to ensure mobility of the user equipment, the user equipment should measure quality of neighboring cells having the same central frequency as that of the serving cell and cell information well. In this way, measurement of the cell having the same central frequency as that of the serving cell will be referred to as intra-frequency measurement. The user equipment performs intra-frequency measurement and timely reports the result of measurement of cell quality to the network, whereby the purpose of the measured result of corresponding cell quality may be obtained.

A mobile communication provider may manage the network by using a plurality of frequency bands. If a service of the communication system is provided through the plurality of frequency bands, in order to ensure optimized mobility of the user equipment, the user equipment should measure quality of neighboring cells having central frequency different from that of the serving cell and cell information well. In this way, measurement of the cell having central frequency different from that of the serving cell will be referred to as inter-frequency measurement. The user equipment should perform inter-frequency measurement and timely report the result of measurement of cell quality to the network.

If the user equipment supports measurement of heterogeneous networks, cell measurement of the heterogeneous networks may be performed by setup of the base station. This measurement of the heterogeneous networks will be referred to as inter-radio access technology (inter-RAT) measurement. For example, RAT may include a UMTS Terrestrial Radio Access Network (UTRAN) and GSM EDGE Radio Access Network (GERAN) according to the 3GPP standard specifications, and may also include CDMA 2000 system according to the 3GPP2 standard specifications.

Hereinafter, In-Device Coexistence (IDC) and IDC interference will be described.

In order that the user accesses various networks anytime anywhere, it is required that one user equipment should be provided with a transceiver for a wireless communication system such as LTE, WiFi, and Bluetooth (BT) and a global navigation satellite system (GNSS) receiver. Coexistence of different wireless communication systems in one user equipment will be referred to as IDC. Such examples may include a user equipment provided with LTE and BT modules for VoIP service and multimedia service through a BT earphone, a user equipment provided with LTE and WiFi modules for traffic distribution, and a user equipment provided with GNSS and LTE modules for additionally acquiring location information.

Figure 4:
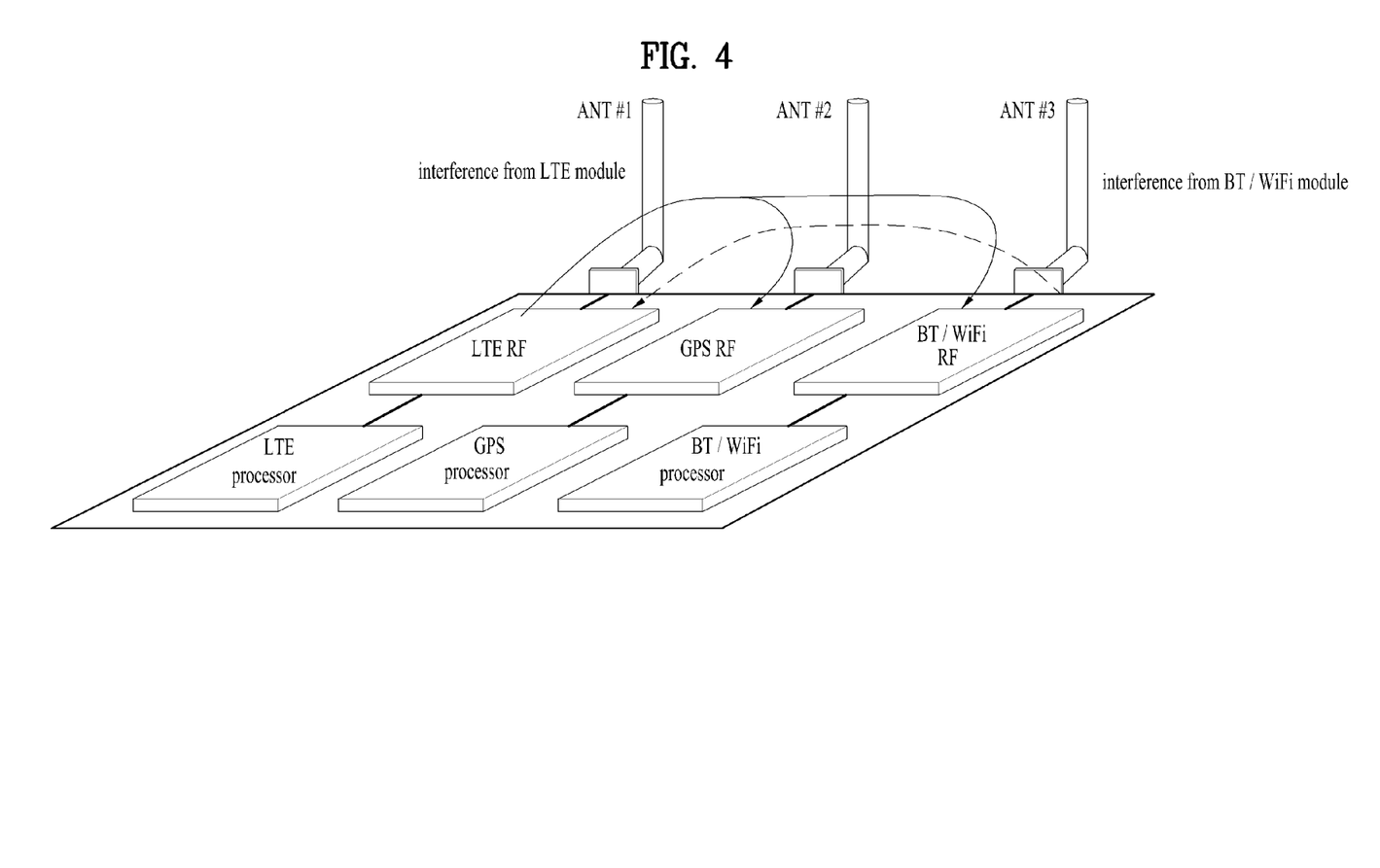
FIG. 4 is a diagram illustrating a user equipment that includes a wireless communication module for LTE system, global positioning system (GPS) and BT/WiFi system.

FIG. 4 is a diagram illustrating a user equipment that includes a wireless communication module for LTE system, global positioning system (GPS) and BT/WiFi system.

Referring to FIG. 4, as several transceivers are located near one another within one user equipment, the power of a signal transmitted from one transceiver may be greater than that of a signal transmitted from another transceiver. In this case, interference may occur between different communication modules. This interference will be referred to as IDC interference. If IDC interference becomes serious, even though there no problem occurs in connection between the user equipment and the base station, ping-pong status where handover continues to be tried may occur.

Generally, the communication modules may be operated at neighboring frequencies as follows in view of frequency, whereby mutual interference of the communication modules may be reduced.

The LTE module may be operated at TDD Band 40 (2300 MHz to 2400 MHz), and the WiFi module or the Bluetooth module may be operated at 2400 MHz to 2483.5 MHz which correspond to an unlicensed band. In this case, transmission of the LTE module may cause interference against the WiFi module or the Bluetooth module, and transmission of the WiFi module or the Bluetooth module may cause interference against reception of the LTE module.

Also, the LTE module may perform uplink transmission at FDD Band 7 (2500 MHz to 2700 MHz), and the Bluetooth module may be operated at 2400 MHz to 2483.5 MHz which correspond to an unlicensed band. In this case, uplink transmission of the LTE module may cause interference against reception of the WiFi module or the Bluetooth module.

Also, the LTE module may be operated at FDD Band 13 (UL: 777-787 MHz, DL: 746-756 MHz) or FDD Band 14 (UL: 788-798 MHz, DL: 758-768 MHz), and the GPS module may receive location information at 1575.42 MHz. In this case, uplink transmission of the LTE module may cause interference against reception of location information of the GPS module.

As one of solutions of the above problems, IDC interference between two transceivers may be prevented from occurring by allowing a frequency interval between respective transceiving signals or physical filters to be obtained sufficiently. However, if several wireless communication modules are operated at neighboring frequencies, it is difficult for the current filter technology to sufficiently eliminate interference.

Separately from an application method of a physical filter scheme, an IDC interference avoidance scheme may be considered about three cases as follows depending on whether there is any coordination with another communication module which coexists with the LTE module and there is any coordination between the LTE module and the base station to eliminate IDC interference.

The first case is that there is no coordination between the communication modules coexisting in one user equipment and between the LTE module and the base station to avoid IDC interference. In this case, the LTE module does not know information on the other communication module that coexists with the LTE module.

The second case is that there is coordination between communication modules coexisting within the user equipment. In this case, the LTE module may know action state (that is, ON/OFF state) between the coexisting modules, traffic transmission state, etc.

Finally, the third case is that there exists coordination between the user equipment as well as coordination between the modules coexisting in the user equipment. The LTE module may measure IDC interference through inter/intra frequency measurement as well as coordination with another module.

In the current 3GPP system, to solve the problem of IDC interference, 1) a method (frequency division multiplexing (FDM) method) for allowing a communication module, which causes interference, or a communication module affected by interference to change frequency, 2) a method (time division multiplexing (TDM) method) for allowing coexisting communication modules to use one frequency through time division, and 3) a method (LTE power control (LTE PC) method) for allowing an LTE module to reduce interference, which affects another coexisting module, by controlling transmission power are considered. Detailed methods and procedures are currently under discussion in the 3GPP.

In case of the FDM method, the user equipment performs inter-frequency measurement to find out a target frequency for handover. However, in order to reduce unnecessary measurement, the user equipment measures frequency other than the frequency at which the user equipment stays, if a channel measured value of the serving cell, which receives a service, is less than a threshold value (s-measure) set by the network. Otherwise, the user equipment measures other frequency regardless of the measured value of the serving cell if the network does not set the threshold value. This will be described with reference to the drawing.

Figure 5:
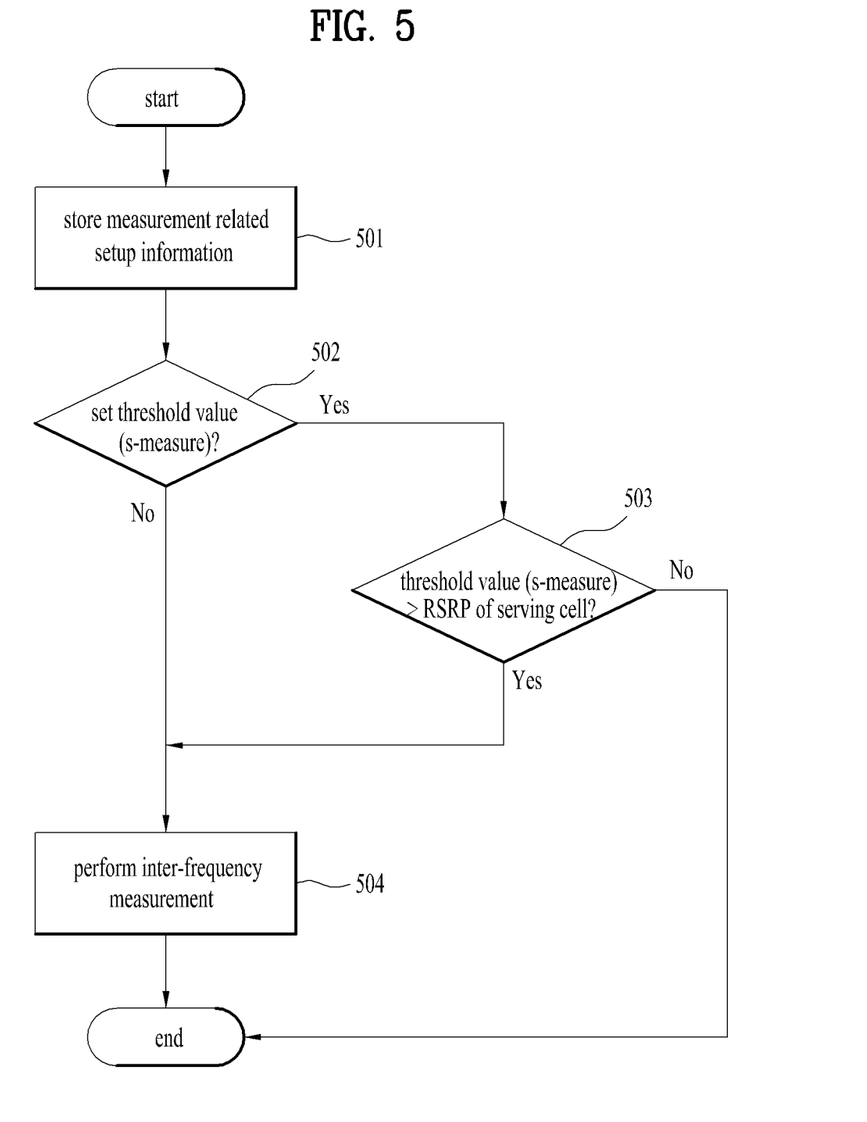
FIG. 5 is a flow chart illustrating a general procedure for inter-frequency measurement.

FIG. 5 is a flow chart illustrating a general procedure for inter-frequency measurement.

Referring FIG. 5, the user equipment receives measurement related setup information from the network and stores the received measurement related setup information at step 501, and determines whether the threshold value (s-measure) is set in the measurement related setup information at step 502.

If the threshold value is set, the user equipment determines whether the channel measured value of the serving cell, which receives a service, for example, reference signal received power (RSRP) is less than the threshold value (s-measure) set by the network, and does not perform inter-frequency measurement if the RSRP is not less than the threshold value (s-measure).

However, if the threshold value (s-measure) is not set in the measurement related setup information, or if RSRP is less than the threshold value (s-measure), the user equipment performs inter-frequency measurement on the basis of the measurement related setup information at step 504.

In the meantime, since IDC interference occurs in one user equipment, generally, the network does not know that IDC interference occurs in the user equipment. Accordingly, the network does not change the threshold value, which is previously set, and the user equipment performs inter-frequency measurement by using the threshold value (s-measure). As a result, the user equipment may start inter-frequency measurement if quality of the LTE serving cell is not better than the threshold value (s-measure) due to IDC interference. For this reason, handover of the user equipment is delayed, which means quality deterioration of the LTE service. Also, the delayed handover of the LTE module may cause deterioration of service quality of the existing system.

Accordingly, the present invention suggests a method for avoiding interference that may occur as one or more other communication modules (for example, BT module, WiFi module, GNSS module, etc.) coexisting with the LTE module within the user equipment are operated at neighboring frequencies. In more detail, if one or more other communication modules start to be operated, the LTE module immediately starts inter-frequency measurement and performs fast handover by transmitting the measured result value to the base station.

It is assumed that driving start and driving end of the other communication modules in the LTE module may be identified through coordination in the user equipment. In this case, examples of driving start of the other communication modules include the case where the other communication modules including the LTE module are powered on, the case where an application program or session of the other communication modules including the LTE module start to be operated, and the case where the LTE module receives an indicator indicating that interference will occur, from the other communication modules. Also, examples of driving end of the other communication modules include the case where the other communication modules including the LTE module are powered off, the case where an application program or session of the other communication modules including the LTE module stops its operation, and the case where the LTE module receives an indicator indicating that interference will be eliminated, from the other communication modules.

According to the embodiment of the present invention, if the LTE module recognizes that the other communication modules start to be driven, it regards that the threshold value is not set, and starts inter-frequency measurement. In other words, the LTE module starts measurement for a target frequency, which is previously set, regardless of the channel measured value of the serving cell. Also, if the LTE module recognizes that the other communication modules stop their driving, it starts inter-frequency measurement by using the threshold value (s-measure) which is previously set. In other words, the LTE module starts inter-frequency measurement if the channel measured value of the serving cell is less than the threshold value (s-measure). The LTE module measures the frequency only of the serving cell if not so.

Additionally, if the LTE module performs handover at different frequencies due to IDC interference of the serving cell, the user equipment starts inter-frequency measurement by using the threshold value (s-measure) which is previously set. In other words, if the channel measured value of the serving cell is less than the threshold value (s-measure), the user equipment starts inter-frequency measurement. The user equipment measures only frequency of the serving cell if not so.

The LTE module transmits the measured result to the base station together with additional information (for example, additional bit) for indicating that the measured result it the value measured by disregarding the measurement related setup information received from the base station.

Figure 6:
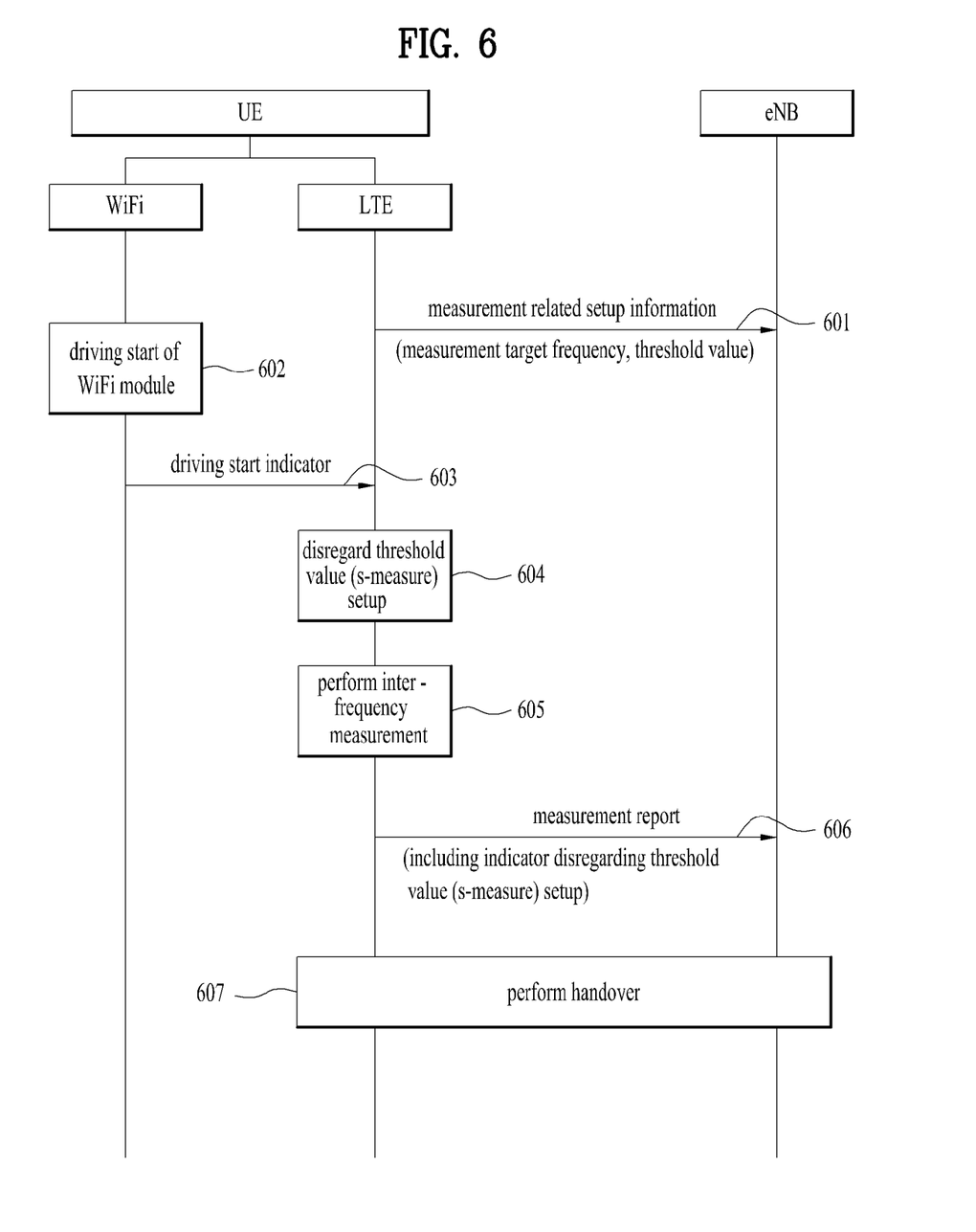
FIG. 6 is a flow chart illustrating a method for performing inter-frequency measurement in a user equipment in accordance with the embodiment of the present invention.

FIG. 6 is a flow chart illustrating a method for performing inter-frequency measurement in a user equipment in accordance with the embodiment of the present invention. In particular, FIG. 6 illustrates that the LTE module performs inter-frequency measurement for handover if the WiFi module starts to be operated in an environment where the WiFi module and the LTE module within one user equipment are operated at neighboring frequencies. Also, it is assumed that driving start of the WiFi module may be recognized by the LTE module through internal coordination between the communication modules.

Referring to FIG. 6, the LTE module receives the measurement related setup information from the base station eNB and stores the received information therein at step 601. In this case, the measurement related setup information includes measurement objects, a threshold value, etc., which are to be measured by the LTE module.

If the WiFi module starts to be operated as illustrated in step 602 to transmit data, it internally notifies the LTE module of information such as operation frequency and transmission power of the WiFi module, which is required for the LTE module to identify information of IDC interference, as illustrated in step 603.

The LTE module that has recognized driving start of the WiFi module is ready to immediately perform inter-frequency measurement to quickly perform handover without deteriorating quality of service (QoS). In other words, the LTE module disregards the threshold value (s-measure) stored in the use equipment.

Subsequently, the LTE module performs inter-frequency measurement on the basis of other measurement related setup information except for the threshold value (s-measure) at step 605, and reports the measured result to the base station at step 606. In this case, it is preferable that the LTE module reports the measured result together with an indicator, which indicates that the reported result is measured by disregarding the threshold value (s-measure).

Finally, the base station performs handover on the basis of the measured result at step 607.

Figure 7:
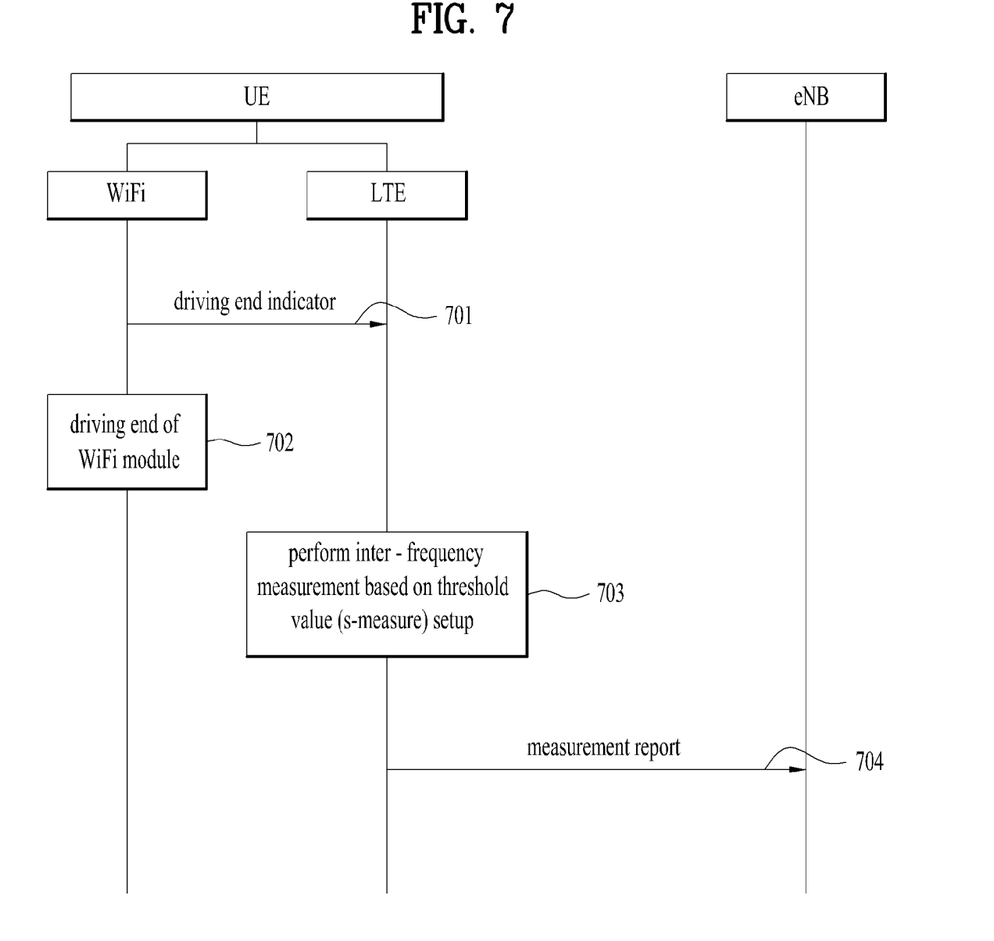
FIG. 7 is a flow chart illustrating another method for performing inter-frequency measurement in a user equipment in accordance with the embodiment of the present invention.

FIG. 7 is a flow chart illustrating another method for performing inter-frequency measurement in a user equipment in accordance with the embodiment of the present invention. In particular, FIG. 7 illustrates an operation related to measurement of the LTE module if the operation of the WiFi module ends in a state that the LTE module and the WiFi module coexist within one user equipment in the same manner as FIG. 6. Also, it is assumed that the LTE module has received information for measurement from the base station and is performing inter-frequency measurement while disregarding the threshold value (s-measure) due to the operation of the WiFi module.

Referring to FIG. 7, the WiFi module internally notifies the LTE module of operation end of the WiFi module as illustrated in step 701 so that the LTE module may know that IDC interference does not occur any more due to the WiFi module. Afterwards, the WiFi module ends its operation as illustrated in step 702. In other words, the user equipment turns off the WiFi module after completing data transmission and reception.

The LTE module that has internally recognized operation end of the WiFi module performs inter-frequency measurement by using the threshold value (s-measure) stored in the user equipment, at step 703 to reduce unnecessary measurement. Accordingly, the LTE module reports corresponding measurement information to the base station as illustrated in step 704 if a specific event occurs through inter-frequency measurement.

According to the present invention, when it is expected that IDC interference occurs due to driving start of the other communication module coexisting in the user equipment, the LTE module may immediately perform inter-frequency measurement by effectively using the measurement related setup information received from the network, whereby the LTE module may quickly perform handover while reducing unnecessary measurement. As a result, QoS, which may occur in one user equipment due to IDC interference, may be prevented from being deteriorated.

In the meantime, in addition to the aforementioned FDM method, as a method for eliminating interference on the basis of the TDM method, there may be considered a method for allowing the base station to shift the user equipment at a DRX state by transmitting buffer status reporting (BSR) when the LTE module recognizes driving start of the other communication module.

Also, as a method for eliminating interference by using LTE PC, there may be considered a method for allowing the base station to reduce transmission power of the LTE module of the user equipment by transmitting power headroom reporting (PHR) when the LTE module recognizes driving start of the other communication module.

Figure 8:
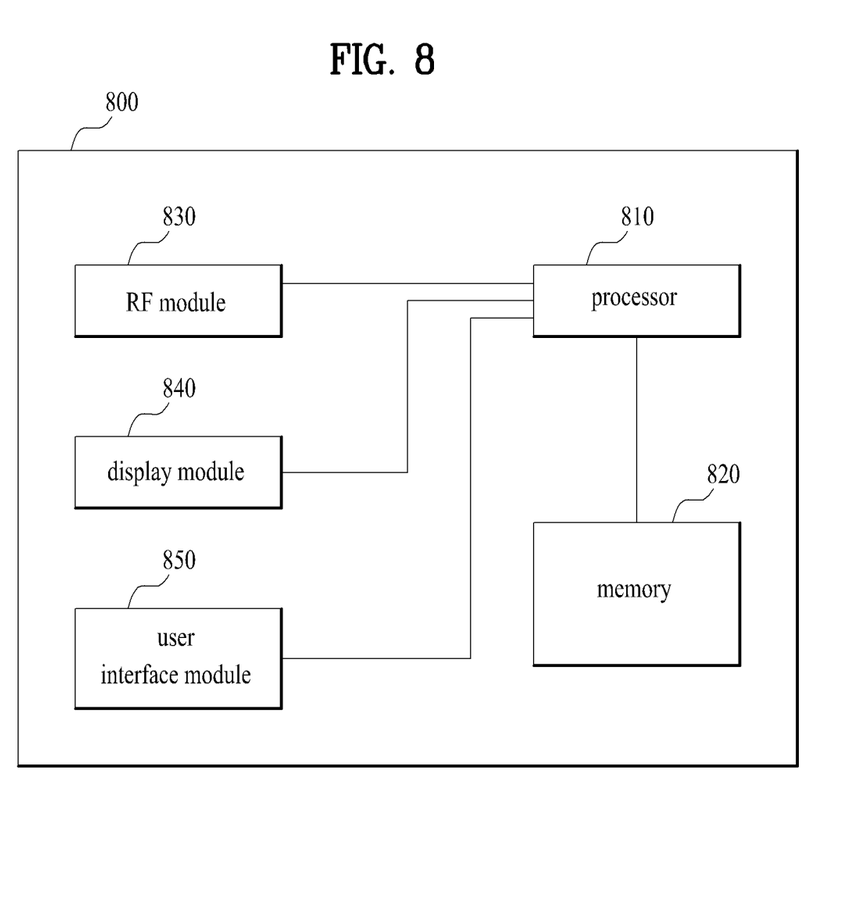
FIG. 8 is a block diagram illustrating a communication transceiver according to the embodiment of the present invention.

FIG. 8 is a block diagram illustrating a communication transceiver according to the embodiment of the present invention. The transceiver may be a part of the base station or the user equipment.

Referring to FIG. 8, the transceiver 800 includes a processor 810, a memory 820, a radio frequency (RF) module 830, a display module 840, and a user interface module 850.

The transceiver 800 is illustrated for convenience of description, and some of its modules may be omitted. Also, the transceiver 800 may further include necessary modules. Moreover, some modules of the transceiver 800 may be divided into segmented modules. The processor 810 is configured to perform the operation according to the embodiment of the present invention illustrated with reference to the drawings.

In more detail, if the transceiver is a part of the base station, the processor 810 may server to generate a control signal and map the generated control signal into a control channel set within a plurality of frequency blocks. Also, if the transceiver is a part of the user equipment, the processor 810 may identify the control channel indicated by the signals received from the plurality of frequency blocks and extract the control signal from the control channel.

Afterwards, the processor 810 may perform a necessary operation on the basis of the control signal. The detailed operation of the processor 810 will be understood with reference to the disclosure described with reference to FIG. 1 to FIG. 7.

The memory 820 is connected with the processor 810 and stores an operating system, an application, a program code, and data therein. The RF module 830 is connected with the processor 810 and converts a baseband signal to a radio signal or vice versa. To this end, the RF module 830 performs analog conversion, amplification, filtering and frequency uplink conversion, or their reverse processes. The display module 840 is connected with the processor 810 and displays various kinds of information. Examples of the display module 840 include, but not limited to, a liquid crystal display (LCD), a light emitting diode (LED), and an organic light emitting diode (OLED). The user interface module 850 is connected with the processor 810, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between a relay node and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as a mobile station (MS) and a mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for measurement to eliminate in-device coexistence (IDC) interference in a wireless communication system and the device for the same have been described based on the 3GPP LTE system, they may be applied to various wireless communication systems in addition to the 3GPP LTE system.

The invention claimed is:

1. A method for performing measurement to eliminate In-Device Coexistence (IDC) interference by a first communication module of a user equipment in a wireless communication system, the method comprising:
receiving, by the first communication module, measurement related setup information from a base station,
wherein the measurement related setup information includes a threshold value related to a measured result of a serving cell;
measuring, by the first communication module, a serving frequency of the first communication module to obtain a frequency measured value;
only when the first communication module is in a state of driving and a message indicating that a driving start is received from one or more second communication modules which coexist in the user equipment, immediately performing, by the first communication module, an inter-frequency measurement without comparing the frequency measured value with the threshold value by ignoring the threshold value; and
when the first communication module is in the state of driving and the message indicating the driving start is not received from the one or more second communication modules:
comparing, by the first communication module, the frequency measured value and the threshold value to obtain a comparison result; and
performing, by the first communication module, the inter-frequency measurement, only when the comparison result indicates that the frequency measured value is less than or equal to the threshold value,
wherein the driving start corresponds to a power-on operation of one of the one or more second communication modules or a traffic transmission and reception operation of one of the one or more second communication modules, and
wherein the first communication module in the state of driving performs an uplink transmission or downlink reception.

2. The method according to claim 1, further comprising:
performing, by the first communication module, the inter-frequency measurement, when the message indicates a driving end of one of the one or more second communication modules and a measured channel quality is less than or equal to the threshold value.

3. The method according to claim 1, wherein the one or more second communication modules include at least one of a transmission and reception module for a WiFi system, a Bluetooth transmission and reception module, and a global positioning system (GPS) reception module.

4. The method according to claim 1, further comprising:
reporting a result of the inter-frequency measurement, when the result of the inter-frequency measurement satisfies a specific event.

5. A user equipment in a wireless communication system, the user equipment comprising:
a first communication module configured to transmit and receive a signal to and from a first communication system; and
one or more second communication modules configured to transmit and receive a signal to and from a second communication system,
wherein the first communication module receives measurement related setup information from a base station,
wherein the measurement related setup information includes a threshold value related to a measured result of a serving cell,
wherein the first communication module measures a serving frequency of the first communication module to obtain a frequency measured value,
wherein, only when the first communication module is in a state of driving and a message indicating a driving start is received from the one or more second communication modules which coexist in the user equipment, the first communication module performs an inter-frequency measurement immediately by ignoring the threshold value in order not to compare the frequency measured value with the threshold value,
wherein, when the first communication module is in the state of driving and the message indicating the driving start is not received from the one or more second communication modules:
the first communication module compares the frequency measured value and the threshold value to obtain a comparison result; and
the first communication module performs the inter-frequency measurement, only when the comparison result indicates that the frequency measured value is less than or equal to the threshold value,
wherein the driving start corresponds to a power-on operation of one of the one or more second communication modules or a traffic transmission and reception operation of one of the one or more second communication modules, and
wherein the first communication module in the state of driving performs an uplink transmission or downlink reception.

6. The user equipment according to claim 5, wherein, when the message indicates a driving end of one of the one or more second communication modules, the first communication module compares the frequency measured value of the serving frequency of the first communication module with the threshold value, and performs the inter-frequency measurement when the comparison result indicates that the frequency measured value is less than the threshold value.

7. The user equipment according to claim 5, wherein the one or more second communication modules include at least one of a transmission and reception module for a WiFi system, a Bluetooth transmission and reception module, and a global positioning system (GPS) reception module.

8. The user equipment according to claim 5, wherein the first communication module performs the inter-frequency measurement when the message indicates a driving end of one of the one or more second communication modules and that a measured channel quality is less than or equal to the threshold value.

9. The user equipment according to claim 5, wherein the first communication module reports a result of the inter-frequency measurement, when the result of the inter-frequency measurement satisfies a specific event.

* * * * *